(12) United States Patent
Khlat

(10) Patent No.: US 12,335,073 B2
(45) Date of Patent: *Jun. 17, 2025

(54) INTRA-SYMBOL VOLTAGE MODULATION IN A WIRELESS COMMUNICATION CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/977,203

(22) Filed: Oct. 31, 2022

(65) Prior Publication Data

US 2023/0133842 A1    May 4, 2023

Related U.S. Application Data

(60) Provisional application No. 63/275,583, filed on Nov. 4, 2021, provisional application No. 63/285,227, filed on Dec. 2, 2021.

(51) Int. Cl.
*H04L 25/03* (2006.01)
*H04L 5/00* (2006.01)

(52) U.S. Cl.
CPC ...... *H04L 25/03847* (2013.01); *H04L 5/0007* (2013.01)

(58) Field of Classification Search
CPC ............. H04L 25/03847; H04L 5/0007; H04L 25/4902; H04L 5/1423; H04L 27/361;
(Continued)

(56) References Cited

U.S. PATENT DOCUMENTS 5,982,233 A * 11/1999 Hellmark ................. H03F 3/24
7,859,338 B2    12/2010 Bajdechi et al.
(Continued)

FOREIGN PATENT DOCUMENTS

DE    102019218816 A1    6/2020
EP         2254237 B1 *   7/2012    ............. H04L 5/007
(Continued)

OTHER PUBLICATIONS

International Preliminary Report on Patentability for International Patent Application No. PCT/US2021/061721, mailed Apr. 4, 2023, 21 pages.

(Continued)

*Primary Examiner* — Lana N Le
(74) *Attorney, Agent, or Firm* — Withrow & Terranova, P.L.L.C.

(57) ABSTRACT

Intra-symbol voltage modulation in a wireless communication circuit is disclosed. In a wireless communication circuit, a power amplifier circuit is configured to amplify a radio frequency (RF) signal based on a modulated voltage that tracks a time-variant input power of the RF signal. Herein, intra-symbol voltage modulation means that the modulated voltage can be adapted within a voltage modulation interval(s), such as an orthogonal frequency division multiplexing (OFDM) symbol duration. In embodiments disclosed herein, the voltage modulation interval(s) is divided into multiple voltage modulation subintervals and a respective voltage target is determined for each of the voltage modulation subintervals. Accordingly, the modulated voltage can be adapted in each of the voltage modulation subintervals according to the respective voltage target. By performing intra-symbol voltage modulation during the voltage modulation interval(s), the power amplifier circuit (Continued)

can operate with higher efficiency and prevent distortion (e.g., amplitude clipping) when amplifying the RF signal.

20 Claims, 8 Drawing Sheets

(58) Field of Classification Search
CPC ...... H03F 3/24; H03F 2200/351; H03F 1/025; H04B 1/04; H04B 10/505; H04B 1/708; H04B 10/50575
See application file for complete search history.

(56) References Cited

U.S. PATENT DOCUMENTS

| | | | |
|---|---|---|---|
| 8,159,309 | B1 | 4/2012 | Khlat et al. |
| 8,718,188 | B2 | 5/2014 | Balteanu et al. |
| 8,912,769 | B2 | 12/2014 | Lin et al. |
| 9,020,453 | B2 | 4/2015 | Briffa et al. |
| 9,069,365 | B2 | 6/2015 | Brown et al. |
| 9,148,090 | B2 | 9/2015 | Tsuji |
| 9,172,331 | B2 | 10/2015 | Nagasaku et al. |
| 9,231,527 | B2 | 1/2016 | Hur et al. |
| 9,252,724 | B2 | 2/2016 | Wimpenny |
| 9,350,299 | B2 | 5/2016 | Tsuj |
| 9,356,512 | B2 | 5/2016 | Chowdhury et al. |
| 9,356,760 | B2 | 5/2016 | Larsson et al. |
| 9,391,567 | B2 | 7/2016 | Kacman |
| 9,407,476 | B2 | 8/2016 | Lim et al. |
| 9,496,828 | B2 | 11/2016 | Ye |
| 9,560,595 | B2 | 1/2017 | Dakshinamurthy et al. |
| 9,590,563 | B2 | 3/2017 | Wimpenny |
| 9,614,477 | B1 | 4/2017 | Rozenblit et al. |
| 9,634,560 | B2 | 4/2017 | Ek |
| 9,755,677 | B2 | 9/2017 | Talty et al. |
| 9,991,913 | B1 | 6/2018 | Dinur et al. |
| 10,097,145 | B1 | 10/2018 | Khlat et al. |
| 10,103,926 | B1 | 10/2018 | Khlat |
| 10,142,074 | B2 | 11/2018 | Wang et al. |
| 10,243,524 | B2 | 3/2019 | Orr |
| 10,326,408 | B2 | 6/2019 | Khlat et al. |
| 10,476,437 | B2 | 11/2019 | Nag et al. |
| 10,778,094 | B2 | 9/2020 | de Cremoux |
| 10,862,428 | B2 | 12/2020 | Henzler et al. |
| 10,998,859 | B2 | 5/2021 | Khlat |
| 11,018,627 | B2 | 5/2021 | Khlat |
| 11,018,638 | B2 | 5/2021 | Khlat et al. |
| 11,088,660 | B2 | 8/2021 | Lin et al. |
| 11,223,323 | B2 | 1/2022 | Drogi et al. |
| 11,223,325 | B2 | 1/2022 | Drogi et al. |
| 11,349,513 | B2 | 5/2022 | Khlat et al. |
| 11,489,695 | B2* | 11/2022 | Ngo .................... H04L 25/4902 |
| 11,539,330 | B2 | 12/2022 | Khlat |
| 11,569,783 | B2 | 1/2023 | Nomiyama et al. |
| 11,588,449 | B2 | 2/2023 | Khlat et al. |
| 11,665,654 | B2 | 5/2023 | Park et al. |
| 11,716,057 | B2 | 8/2023 | Khlat |
| 11,728,774 | B2 | 8/2023 | Khlat |
| 11,757,414 | B2 | 9/2023 | Drogi et al. |
| 11,894,767 | B2 | 2/2024 | Khlat et al. |
| 11,909,385 | B2 | 2/2024 | Khlat |
| 11,973,469 | B2 | 4/2024 | Retz et al. |
| 11,984,853 | B2 | 5/2024 | Khlat |
| 11,984,854 | B2 | 5/2024 | Khlat et al. |
| 12,063,018 | B2 | 8/2024 | Khlat |
| 2003/0099230 | A1 | 5/2003 | Wenk |
| 2004/0179382 | A1 | 9/2004 | Thaker et al. |
| 2011/0109393 | A1 | 5/2011 | Adamski et al. |
| 2012/0068767 | A1 | 3/2012 | Henshaw et al. |
| 2013/0141063 | A1 | 6/2013 | Kay et al. |
| 2013/0141068 | A1* | 6/2013 | Kay .................... H04B 1/04 |
| 2014/0055197 | A1 | 2/2014 | Khlat et al. |
| 2014/0097895 | A1 | 4/2014 | Khlat et al. |
| 2014/0232458 | A1 | 8/2014 | Arno et al. |
| 2014/0312710 | A1 | 10/2014 | Li |
| 2014/0315504 | A1 | 10/2014 | Sakai et al. |
| 2014/0361837 | A1 | 12/2014 | Strange et al. |
| 2015/0270806 | A1 | 9/2015 | Wagh et al. |
| 2016/0094192 | A1 | 3/2016 | Khesbak et al. |
| 2016/0241208 | A1 | 8/2016 | Lehtola |
| 2016/0294587 | A1 | 10/2016 | Jiang et al. |
| 2017/0331433 | A1 | 11/2017 | Khlat |
| 2017/0373644 | A1 | 12/2017 | Gatard et al. |
| 2018/0092047 | A1 | 3/2018 | Merlin |
| 2018/0234011 | A1 | 8/2018 | Muramatsu et al. |
| 2018/0257496 | A1 | 9/2018 | Andoh et al. |
| 2018/0278213 | A1 | 9/2018 | Henzler et al. |
| 2018/0351454 | A1 | 12/2018 | Khesbak et al. |
| 2019/0068234 | A1 | 2/2019 | Khlat et al. |
| 2019/0109566 | A1 | 4/2019 | Folkmann et al. |
| 2019/0181813 | A1 | 6/2019 | Maxim et al. |
| 2019/0222175 | A1 | 7/2019 | Khlat et al. |
| 2019/0288645 | A1 | 9/2019 | Nag et al. |
| 2019/0334750 | A1 | 10/2019 | Nomiyama et al. |
| 2019/0356285 | A1 | 11/2019 | Khlat et al. |
| 2020/0076297 | A1 | 3/2020 | Nag et al. |
| 2020/0127612 | A1 | 4/2020 | Khlat et al. |
| 2020/0136575 | A1 | 4/2020 | Khlat et al. |
| 2020/0204422 | A1 | 6/2020 | Khlat |
| 2020/0212796 | A1 | 7/2020 | Murphy et al. |
| 2020/0228063 | A1 | 7/2020 | Khlat |
| 2020/0266766 | A1 | 8/2020 | Khlat et al. |
| 2020/0295708 | A1 | 9/2020 | Khlat |
| 2020/0321917 | A1 | 10/2020 | Nomiyama et al. |
| 2020/0336105 | A1 | 10/2020 | Khlat |
| 2020/0336111 | A1 | 10/2020 | Khlat |
| 2020/0350865 | A1* | 11/2020 | Khlat ..................... H03F 1/025 |
| 2020/0382061 | A1 | 12/2020 | Khlat |
| 2020/0382062 | A1 | 12/2020 | Khlat |
| 2020/0389132 | A1 | 12/2020 | Khlat et al. |
| 2021/0036604 | A1 | 2/2021 | Khlat et al. |
| 2021/0099137 | A1 | 4/2021 | Drogi et al. |
| 2021/0126599 | A1 | 4/2021 | Khlat et al. |
| 2021/0175798 | A1 | 6/2021 | Liang |
| 2021/0184708 | A1 | 6/2021 | Khlat |
| 2021/0194517 | A1 | 6/2021 | Mirea et al. |
| 2021/0218374 | A1 | 7/2021 | Poulin |
| 2021/0226585 | A1 | 7/2021 | Khlat |
| 2021/0257971 | A1 | 8/2021 | Kim et al. |
| 2021/0265953 | A1 | 8/2021 | Khlat |
| 2021/0288615 | A1 | 9/2021 | Khlat |
| 2021/0389789 | A1 | 12/2021 | Khlat et al. |
| 2021/0391833 | A1 | 12/2021 | Khlat et al. |
| 2022/0021302 | A1 | 1/2022 | Khlat et al. |
| 2022/0029614 | A1 | 1/2022 | Khlat |
| 2022/0037982 | A1 | 2/2022 | Khlat et al. |
| 2022/0052655 | A1 | 2/2022 | Khalt |
| 2022/0057820 | A1 | 2/2022 | Khlat et al. |
| 2022/0066487 | A1 | 3/2022 | Khlat |
| 2022/0069788 | A1 | 3/2022 | King et al. |
| 2022/0123744 | A1 | 4/2022 | Khlat |
| 2022/0200447 | A1 | 6/2022 | Khlat |
| 2022/0224364 | A1 | 7/2022 | Kim et al. |
| 2022/0271714 | A1 | 8/2022 | Khlat |
| 2022/0294486 | A1 | 9/2022 | Cao et al. |
| 2022/0407465 | A1 | 12/2022 | Khlat |
| 2023/0081095 | A1 | 3/2023 | Khlat |
| 2023/0085587 | A1 | 3/2023 | Shute |
| 2023/0118768 | A1 | 4/2023 | Khlat |
| 2023/0119987 | A1 | 4/2023 | Khlat |
| 2023/0124652 | A1* | 4/2023 | Khlat ..................... H04B 1/04 455/102 |
| 2023/0124941 | A1 | 4/2023 | Khlat |
| 2024/0172131 | A1 | 5/2024 | Ballantyne et al. |
| 2024/0223129 | A1 | 7/2024 | Retz et al. |

FOREIGN PATENT DOCUMENTS

| | | |
|---|---|---|
| WO | 2018187245 A1 | 10/2018 |
| WO | 2021016350 A1 | 1/2021 |

OTHER PUBLICATIONS

U.S. Appl. No. 17/942,472, filed Sep. 12, 2022.
U.S. Appl. No. 17/946,170, filed Sep. 16, 2022.

(56) References Cited

OTHER PUBLICATIONS

U.S. Appl. No. 17/946,224, filed Sep. 16, 2022.
U.S. Appl. No. 17/946,470, filed Sep. 16, 2022.
U.S. Appl. No. 17/947,567, filed Sep. 19, 2022.
Paek, J.S. et al., "15.2 A 90ns/V Fast-Transition Symbol-Power-Tracking Buck Converter for 5G mm-Wave Phased-Array Transceiver," 2019 IEEE International Solid-State Circuits Conference, Feb. 2019, San Francisco, CA, USA, IEEE, 3 pages.
Notice of Allowance for U.S. Appl. No. 17/217,594, mailed Apr. 3, 2023, 7 pages.
Notice of Allowance for U.S. Appl. No. 17/408,899, mailed Feb. 24, 2023, 9 pages.
Non-Final Office Action for U.S. Appl. No. 17/942,472, mailed Feb. 16, 2023, 13 pages.
Extended European Search Report for European Patent Application No. 22195683.2, mailed Feb. 10, 2023, 12 pages.
Written Opinion for International Patent Application No. PCT/US2021/061721, mailed Mar. 1, 2023, 7 pages.
Extended European Search Report for European Patent Application No. 22200302.2, mailed Mar. 1, 2023, 14 pages.
Extended European Search Report for European Patent Application No. 22200322.0, mailed Mar. 1, 2023, 13 pages.
Extended European Search Report for European Patent Application No. 22200300.6, mailed Feb. 24, 2023, 10 pages.
Extended European Search Report for European Patent Application No. 22200111.7, mailed Feb. 20, 2023, 9 pages.
Non-Final Office Action for U.S. Appl. No. 18/203,197, mailed Sep. 16, 2024, 6 pages.
Notice of Allowance for U.S. Appl. No. 17/947,567, mailed Oct. 23, 2024, 11 pages.
Non-Final Office Action for U.S. Appl. No. 17/946,470, mailed Nov. 20, 2024, 31 pages.
Notice of Allowance for U.S. Appl. No. 17/942,472, mailed Oct. 18, 2023, 10 pages.
Corrected Notice of Allowability for U.S. Appl. No. 17/942,472, mailed Nov. 17, 2023, 5 pages.
Non-Final Office Action for U.S. Appl. No. 17/217,654, mailed Jul. 1, 2022, 9 pages.
Non-Final Office Action for U.S. Appl. No. 17/218,904, mailed May 25, 2022, 14 pages.
Notice of Allowance for U.S. Appl. No. 17/315,652, mailed Jun. 20, 2022, 8 pages.
Mellon, L., "Data Transmission—Parallel vs Serial," Jul. 10, 2017, https://www.quantil.com/content-delivery-insights/content-acceleration/data-transmission/, 4 pages.
International Search Report and Written Opinion for International Patent Application No. PCT/US2021/044596, mailed Apr. 21, 2022, 13 pages.
Written Opinion for International Patent Application No. PCT/US2021/044596, mailed Jun. 10, 2022, 6 pages.
International Preliminary Report on Patentability for International Patent Application No. PCT/US2021/044596, mailed Sep. 1, 2022, 19 pages.
Notice of Allowance for U.S. Appl. No. 17/182,539, mailed Sep. 14, 2022, 7 pages.
Notice of Allowance for U.S. Appl. No. 17/217,654, mailed Oct. 12, 2022, 8 pages.
Non-Final Office Action for U.S. Appl. No. 17/237,244, mailed Sep. 20, 2021, 14 pages.
Notice of Allowance for U.S. Appl. No. 17/237,244, mailed Jan. 27, 2022, 8 pages.
Notice of Allowance for U.S. Appl. No. 17/218,904, mailed Aug. 26, 2022, 9 pages.
Non-Final Office Action for U.S. Appl. No. 17/325,482, mailed Sep. 30, 2021, 10 pages.
Non-Final Office Action for U.S. Appl. No. 17/325,482, mailed Mar. 15, 2022, 10 pages.
Final Office Action for U.S. Appl. No. 17/325,482, mailed Aug. 16, 2022, 12 pages.
Advisory Action for U.S. Appl. No. 17/325,482, mailed Oct. 14, 2022, 3 pages.
Non-Final Office Action for U.S. Appl. No. 17/315,652, mailed Sep. 2, 2021, 7 pages.
Non-Final Office Action for U.S. Appl. No. 17/315,652, mailed Feb. 14, 2022, 12 pages.
Non-Final Office Action for U.S. Appl. No. 17/408,899, mailed Aug. 29, 2022, 13 pages.
International Search Report and Written Opinion for International Patent Application No. PCT/US2021/061721, mailed Mar. 14, 2022, 13 pages.
Written Opinion for International Patent Application No. PCT/US2021/061721, mailed Sep. 9, 2022, 7 pages.
Notice of Allowance for U.S. Appl. No. 17/325,482, mailed Nov. 30, 2022, 8 pages.
Final Office Action for U.S. Appl. No. 17/408,899, mailed Dec. 27, 2022, 13 pages.
Notice of Allowance for U.S. Appl. No. 17/316,828, mailed Sep. 13, 2023, 8 pages.
Final Office Action for U.S. Appl. No. 17/942,472, mailed Jul. 19, 2023, 15 pages.
Advisory Action Action for U.S. Appl. No. 17/942,472, mailed Sep. 15, 2023, 3 pages.

* cited by examiner

INTRA-SYMBOL VOLTAGE MODULATION IN A WIRELESS COMMUNICATION CIRCUIT

RELATED APPLICATIONS

This application claims the benefit of U.S. provisional patent application Ser. No. 63/275,583 filed on Nov. 4, 2021, and U.S. provisional patent application Ser. No. 63/285,227, filed on Dec. 2, 2021, the disclosures of which are incorporated herein by reference in their entireties.

FIELD OF THE DISCLOSURE

The technology of the disclosure relates generally to intra-symbol voltage modulation in a wireless communication circuit.

BACKGROUND

Fifth generation (5G) new radio (NR) (5G-NR) has been widely regarded as the next generation of wireless communication technology beyond the current third generation (3G) and fourth generation (4G) technologies. In this regard, a wireless communication device capable of supporting the 5G-NR wireless communication technology is expected to achieve higher data rates, improved coverage range, enhanced signaling efficiency, and reduced latency.

Downlink and uplink transmissions in a 5G-NR system are widely based on orthogonal frequency division multiplexing (OFDM) technology. In an OFDM based system, physical radio resources are divided into a number of subcarriers in a frequency domain and a number of OFDM symbols in a time domain. The subcarriers are orthogonally separated from each other by a subcarrier spacing (SCS). The OFDM symbols are separated from each other by a cyclic prefix (CP), which acts as a guard band to help overcome inter-symbol interference (ISI) between the OFDM symbols.

A radio frequency (RF) signal communicated in the OFDM based system is often modulated into multiple subcarriers in the frequency domain and multiple OFDM symbols in the time domain. The multiple subcarriers occupied by the RF signal collectively define a modulation bandwidth of the RF signal. The multiple OFDM symbols, on the other hand, define multiple time intervals during which the RF signal is communicated. In the 5G-NR system, the RF signal is typically modulated with a high modulation bandwidth in excess of 200 MHz.

The duration of an OFDM symbol depends on the SCS and the modulation bandwidth. The table below (Table 1) provides some OFDM symbol durations, as defined by 3G partnership project (3GPP) standards for various SCSs and modulation bandwidths. Notably, the higher the modulation bandwidth is, the shorter the OFDM symbol duration will be. For example, when the SCS is 120 KHz and the modulation bandwidth is 400 MHz, the OFDM symbol duration is 8.93 μs.

TABLE 1

| SCS (KHz) | CP (μs) | OFDM Symbol Duration (μs) | Modulation Bandwidth (MHz) |
| --- | --- | --- | --- |
| 15 | 4.69 | 71.43 | 50 |
| 30 | 2.34 | 35.71 | 100 |
| 60 | 1.17 | 17.86 | 200 |
| 120 | 0.59 | 8.93 | 400 |

TABLE 1-continued

In a 5G-NR system, the RF signal can be modulated with a time-variant power that changes from one OFDM symbol to another. In this regard, a power amplifier circuit(s) is required to amplify the RF signal to a certain power level within each OFDM symbol duration. Such inter-symbol power variation creates a unique challenge for a power management integrated circuit (PMIC) because the PMIC must be able to adapt a modulated voltage supplied to the power amplifier circuit within the CP of each OFDM symbol to help avoid distortion (e.g., amplitude clipping) in the RF signal.

SUMMARY

Embodiments of the disclosure relate to intra-symbol voltage modulation in a wireless communication circuit. In a wireless communication circuit, a power amplifier circuit is configured to amplify a radio frequency (RF) signal based on a modulated voltage that tracks a time-variant input power of the RF signal. Herein, intra-symbol voltage modulation means that the modulated voltage can be adapted within a voltage modulation interval(s). In a non-limiting example, the voltage modulation interval(s) is equivalent to an orthogonal frequency division multiplexing (OFDM) symbol duration. In embodiments disclosed herein, the voltage modulation interval(s) is divided into multiple voltage modulation subintervals and a respective voltage target is determined for each of the voltage modulation subintervals. Accordingly, the modulated voltage can be adapted in each of the voltage modulation subintervals according to the respective voltage target. By performing intra-symbol voltage modulation during the voltage modulation interval(s), the modulated voltage can be generated to better track the time-variant input power of the RF signal. As a result, the power amplifier circuit can operate with higher efficiency and prevent distortion (e.g., amplitude clipping) when amplifying the RF signal.

In one aspect, a transceiver circuit is provided. The transceiver circuit includes a digital baseband circuit. The digital baseband circuit is configured to generate a digital input vector having a time-variant amplitude. The transceiver circuit also includes a target voltage processing circuit. The target voltage processing circuit is configured to divide each of multiple voltage modulation intervals into multiple voltage modulation subintervals. The target voltage processing circuit is also configured to determine a respective one of multiple modulated target voltage indicators for each of the multiple voltage modulation subintervals based on the time-variant amplitude of the digital input vector. The target voltage processing circuit is also configured to generate a target voltage signal comprising the multiple modulated target voltage indicators.

In another aspect, a wireless communication circuit is provided. The wireless communication circuit includes a transceiver circuit. The transceiver circuit includes a digital baseband circuit. The digital baseband circuit is configured to generate a digital input vector having a time-variant amplitude. The transceiver circuit also includes a target voltage processing circuit. The target voltage processing circuit is configured to divide each of multiple voltage modulation intervals into multiple voltage modulation subintervals. The target voltage processing circuit is also configured to determine a respective one of multiple modulated target voltage indicators for each of the multiple voltage modulation subintervals based on the time-variant amplitude of the digital input vector. The target voltage processing circuit is also configured to generate a target voltage signal comprising the multiple modulated target voltage indicators.

In another aspect, a method for generating a target voltage for intra-symbol voltage modulation is provided. The method includes generating a digital input vector having a time-variant amplitude. The method also includes dividing each of multiple voltage modulation intervals into multiple voltage modulation subintervals. The method also includes determining a respective one of multiple modulated target voltage indicators for each of the multiple voltage modulation subintervals based on the time-variant amplitude of the digital input vector. The method also includes generating a target voltage signal comprising the multiple modulated target voltage indicators.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
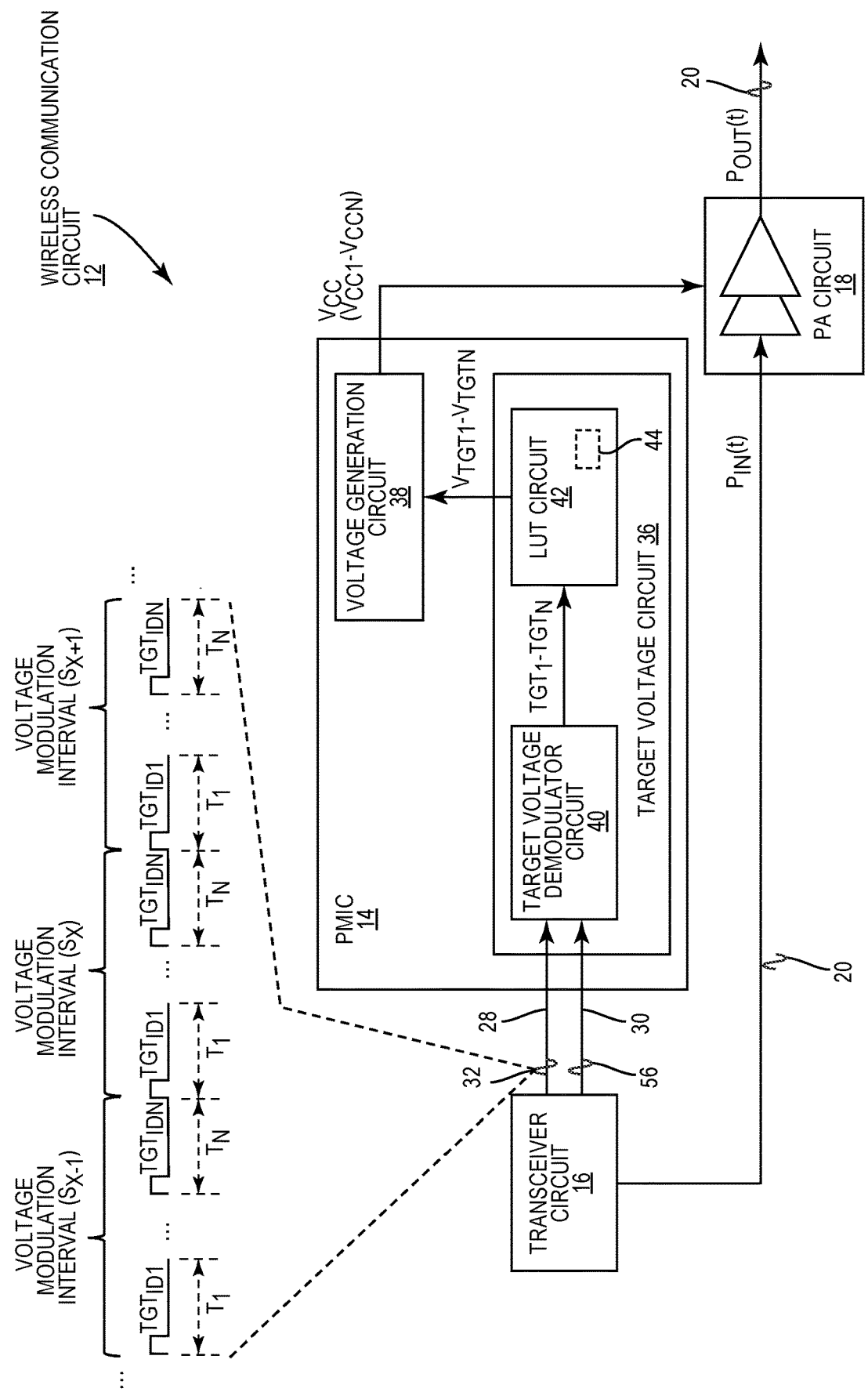
FIG. 2 is a schematic diagram of an exemplary wireless communication circuit wherein a power management integrated circuit (PMIC) and a transceiver circuit are configured according to embodiments of the present disclosure to enable intra-symbol voltage modulation during a voltage modulation interval(s)
Figure 4:
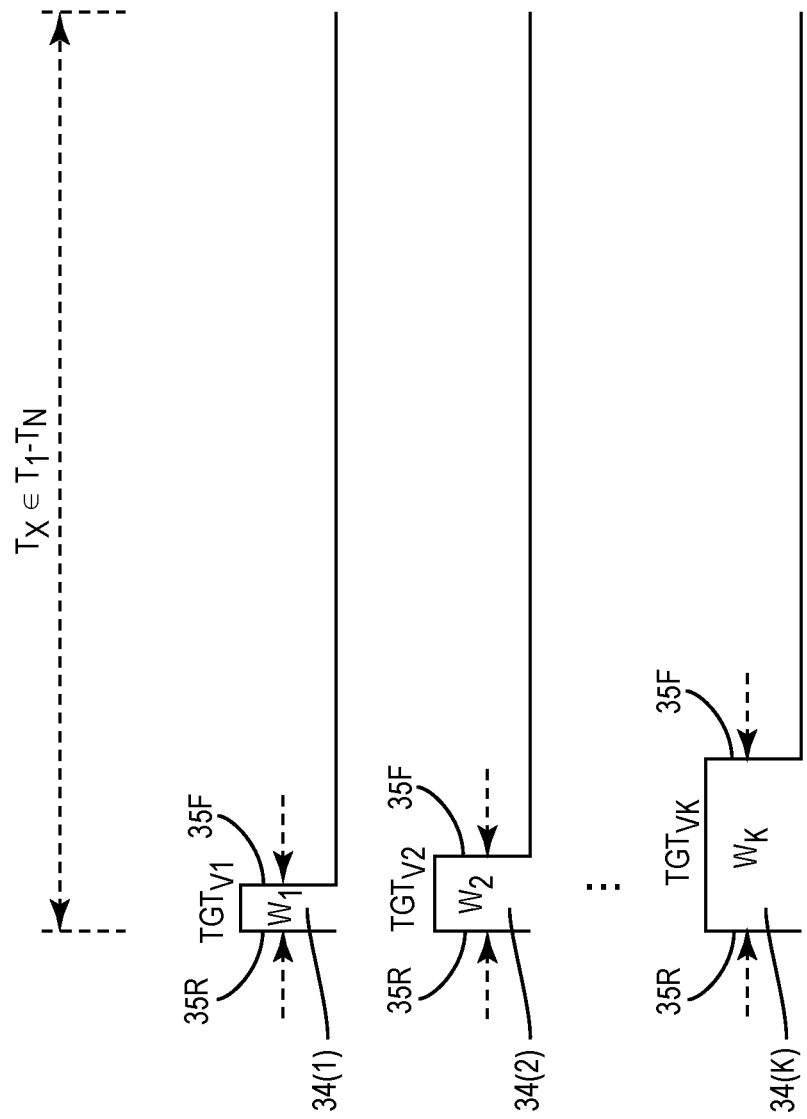
Figure 5:
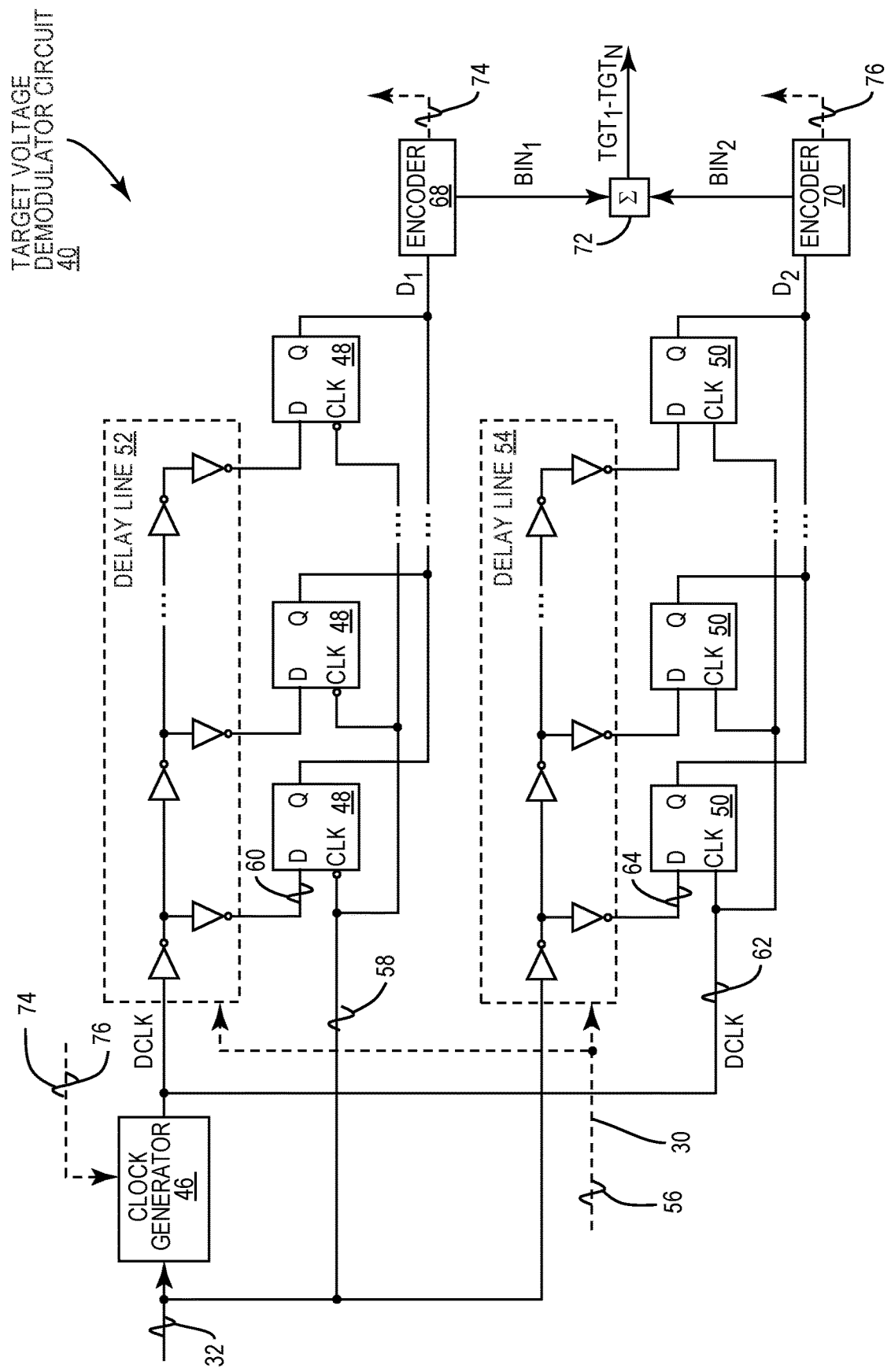
Figure 6:
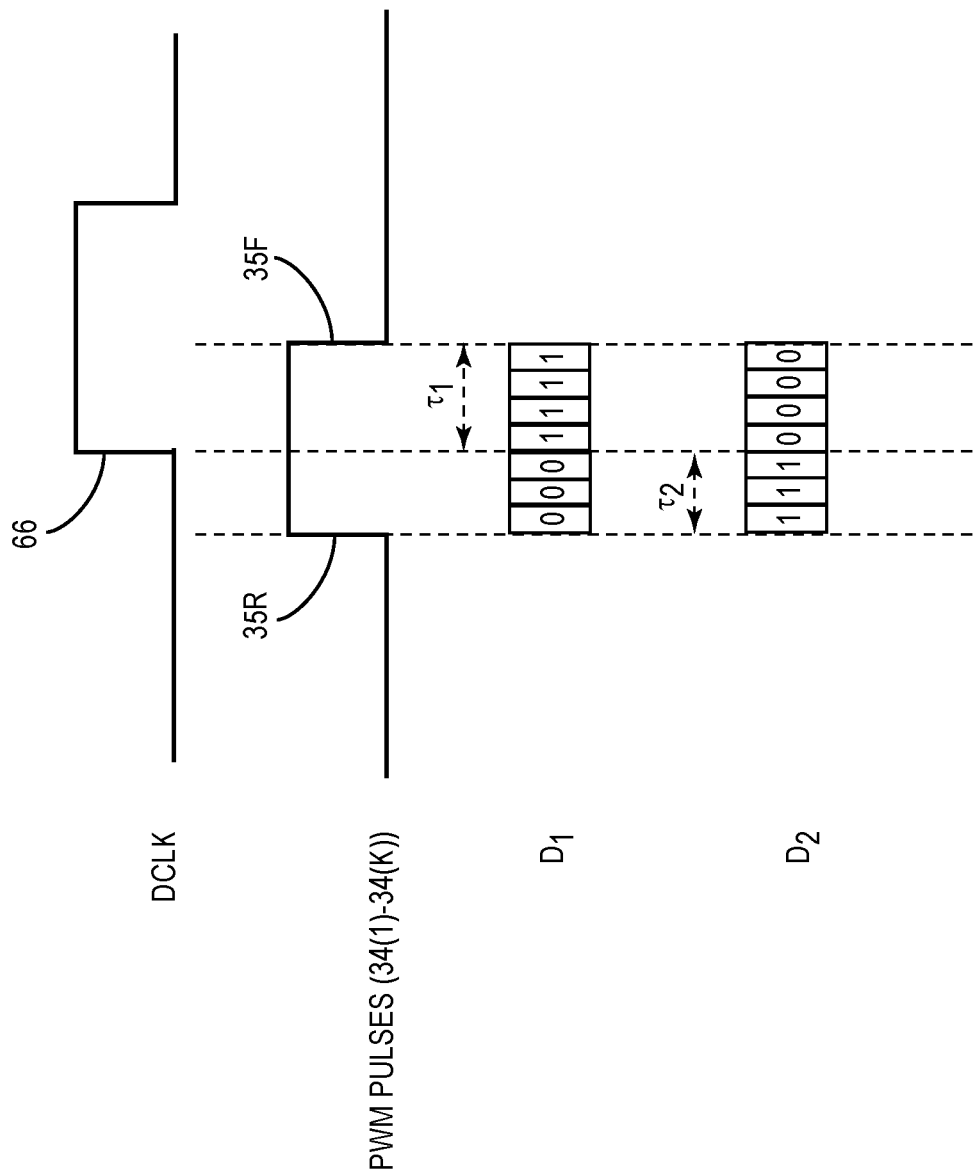
Figure 7:
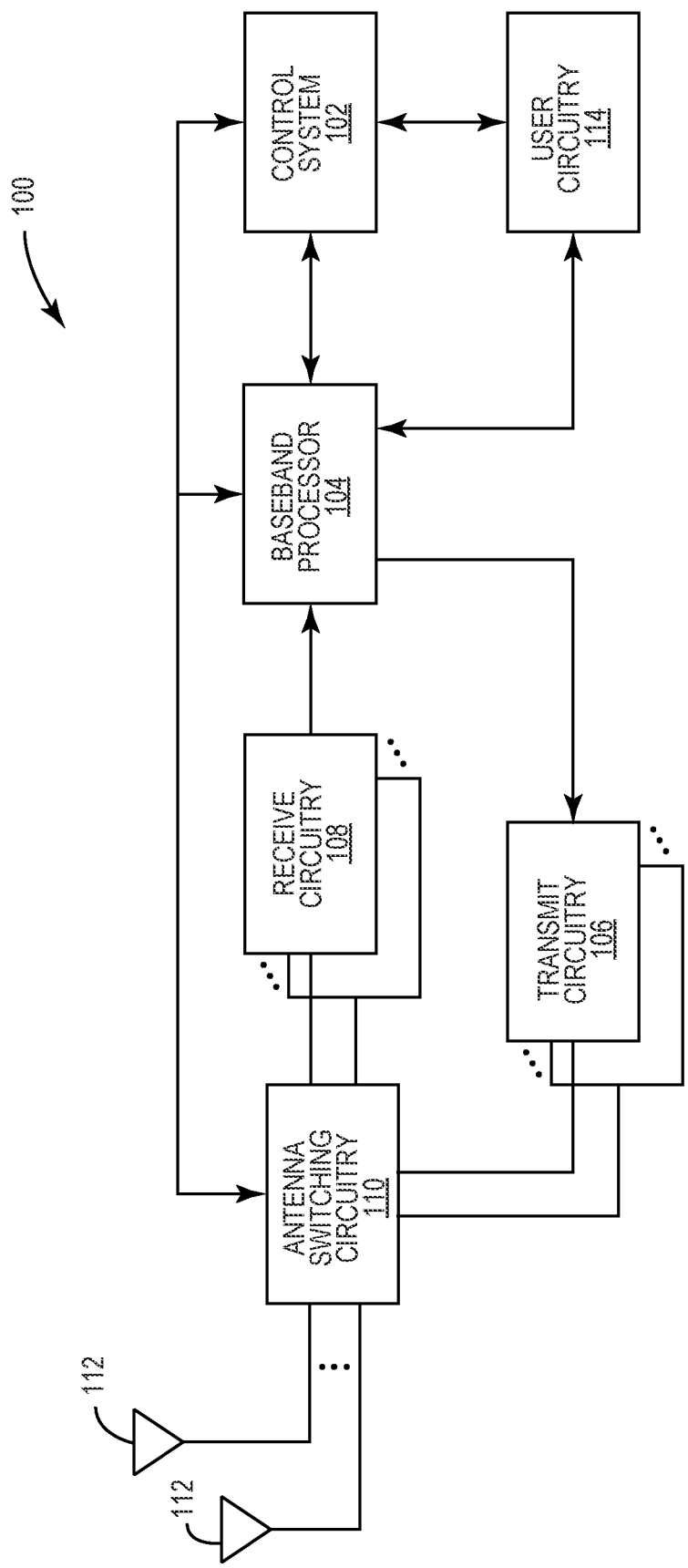
Figure 8:
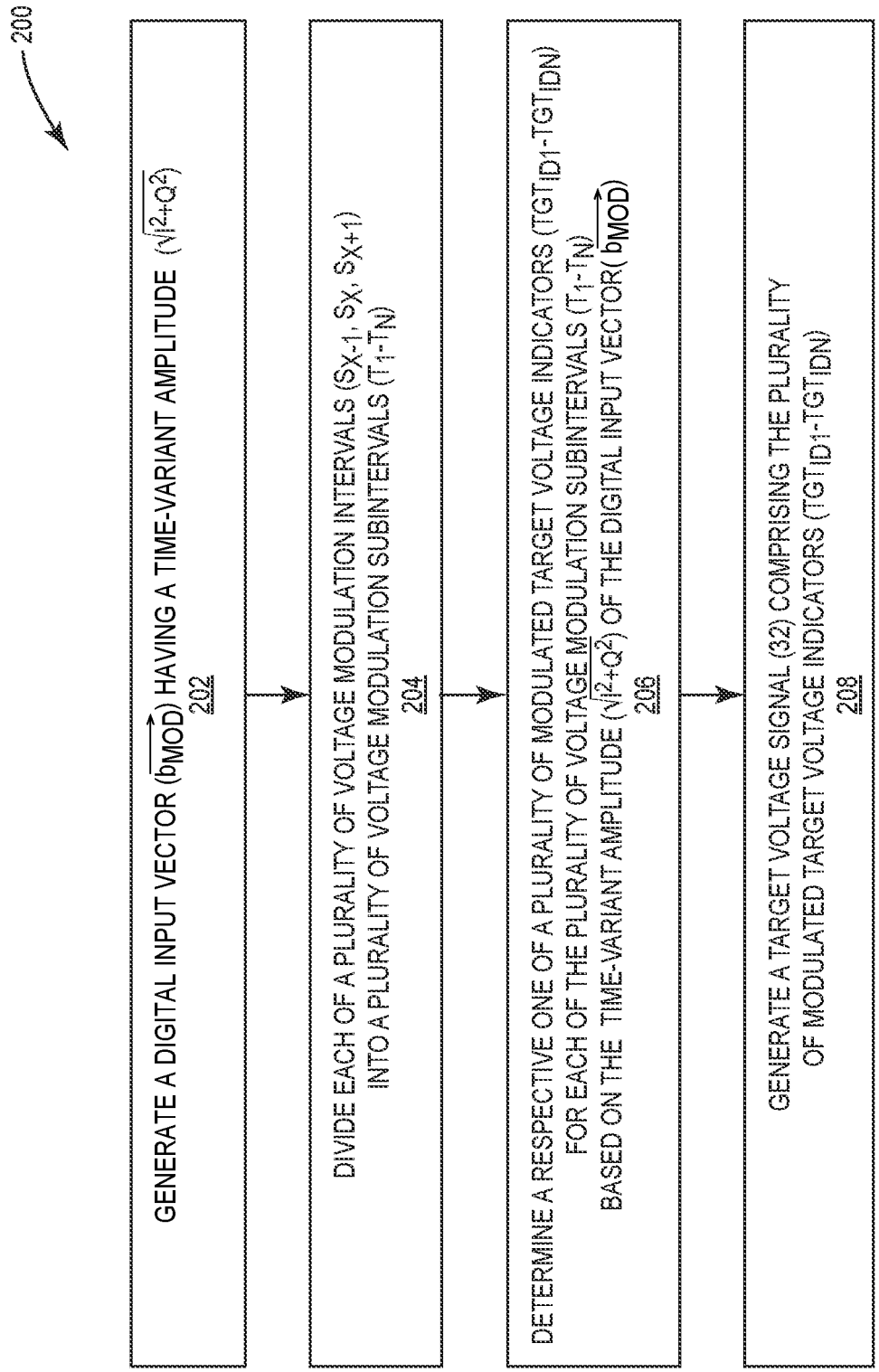

FIG. 4 provides an exemplary illustration as to how multiple modulated target voltage indicators can each be pulse-width modulated to represent different digital target voltage values;

FIG. 5 is a schematic diagram providing an exemplary illustration of a target voltage demodulator circuit, which is provided in the PMIC in FIG. 2 and configured according to an embodiment of the present disclosure;

FIG. 6 is a schematic diagram providing an exemplary illustration as to how the target voltage demodulator circuit of FIG. 5 operates based on a configuration shown in FIG. 5;

FIG. 7 is a schematic diagram of an exemplary user element wherein the wireless communication circuit of FIG. 2 can be provided; and FIG. 8 is a flowchart of an exemplary process for enabling intra-symbol voltage modulation according to embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to intra-symbol voltage modulation in a wireless communication circuit. In a wireless communication circuit, a power amplifier circuit is configured to amplify a radio frequency (RF) signal based on a modulated voltage that tracks a time-variant input power of the RF signal. Herein, intra-symbol voltage modulation means that the modulated voltage can be adapted within a voltage modulation interval(s). In a non-limiting example, the voltage modulation interval(s) is equivalent to an orthogonal frequency division multiplexing (OFDM) symbol duration. In embodiments disclosed herein, the voltage modulation interval(s) is divided into multiple voltage modulation subintervals and a respective voltage target is determined for each of the voltage modulation subintervals. Accordingly, the modulated voltage can be adapted in each of the voltage modulation subintervals according to the respective voltage target. By performing intra-symbol voltage modulation during the voltage modulation interval(s), the modulated voltage can be generated to better track the time-variant input power of the RF signal. As a result, the power amplifier circuit can operate with higher efficiency and prevent distortion (e.g., amplitude clipping) when amplifying the RF signal.

Figure 1:
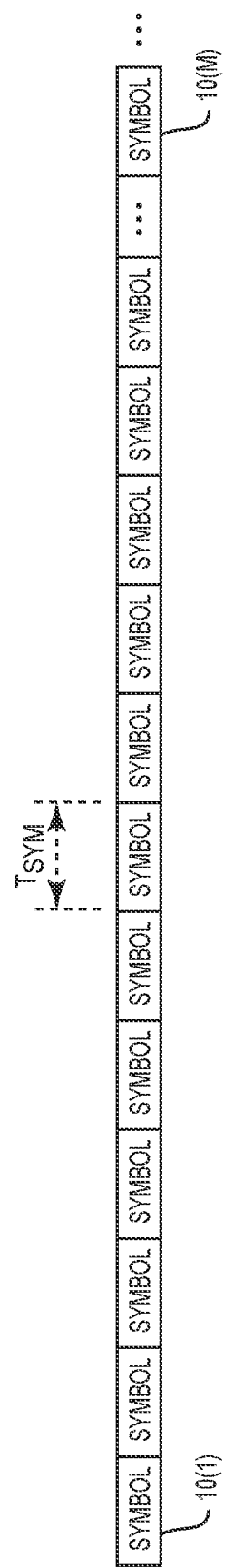
FIG. 1 illustrates multiple symbols that are widely supported in fifth generation (5G) and 5G new-generation (5G-NR) systems for modulating various information onto a communication signal.

Before discussing intra-symbol voltage modulation according to the present disclosure, starting at FIG. 2, an overview of OFDM symbols, which can be used to define a voltage modulation interval(s), is first provided with reference to FIG. 1.

FIG. 1 illustrates multiple symbols 10(1)-10(M) that are widely supported in fifth generation (5G) and 5G new-generation (5G-NR) systems for modulating various information onto a communication signal. In a non-limiting example, the symbols 10(1)-10(M) can be OFDM symbols each having a symbol duration $T_{SYM}$ as defined in Table 1.

As previously shown in Table 1, each of the symbols 14(1)-14(M) has the symbol duration $T_{SYM}$ that depends on the subcarrier spacing (SCS). Once the SCS is chosen, the symbol duration $T_{SYM}$ and the CP of each of the symbols 10(1)-10(M) are set accordingly. In the context of the present disclosure, each of the symbols 10(1)-10(M) is referred to as a voltage modulation interval.

In a conventional wireless communication circuit, a radio frequency (RF) signal can be modulated based on a certain modulation and coding scheme (MCS) to carry various types of information in the symbols 10(1)-10(M). Accordingly, a power management circuit generates a modulated voltage for a power amplifier circuit to amplify the RF signal in each of the symbols 10(1)-10(M). Since the modulated voltage is generated on a per-symbol basis, the modulated voltage in each of the symbols 10(1)-10(M) is typically generated according to a peak power of the RF signal. Although such an approach can prevent amplitude clipping to the RF signal at the peak power, the power amplifier may be forced to operate with lower efficiency when an instantaneous power of the RF signal falls below the peak power. As such, it is desirable to adapt the modulated voltage to within each of the symbols 10(1)-10(M) to help improve operating efficiency of the power amplifier.

In this regard, FIG. 2 is a schematic diagram of an exemplary wireless communication circuit 12 wherein a PMIC 14 and a transceiver circuit 16 are configured according to embodiments of the present disclosure to enable intra-symbol voltage modulation during each of multiple voltage modulation intervals $S_{X-1}$, $S_X$, $S_{X+1}$. Herein, the voltage modulation intervals $S_{X-1}$, $S_X$, $S_{X+1}$ represent three consecutive voltage modulation intervals among any number of voltage modulation intervals, such as the symbols 10(1)-10(M). Accordingly, each of the voltage modulation intervals $S_{X-1}$, $S_X$, $S_{X+1}$ has a respective duration that equals the symbol duration $T_{SYM}$. Understandably, the voltage modulation interval $S_{X-1}$ is an immediately preceding voltage modulation interval of the voltage modulation interval $S_X$, the voltage modulation interval $S_X$ is an immediately preceding voltage modulation interval of the voltage modulation interval $S_{X+1}$, and so on.

The wireless communication circuit 12 further includes a power amplifier circuit 18. The power amplifier circuit 18 is configured to amplify an RF signal 20 from a time-variant input power $P_{IN}(t)$ to a time-variant output power $P_{OUT}(t)$ based on a modulated voltage $V_{CC}$, which can be an envelope tracking (ET) modulated voltage or an average power tracking (APT) modulated voltage. Herein, the transceiver circuit 16 is configured to generate the RF signal 20 having the time-variant input power $P_{IN}(t)$ and the PMIC 14 is configured to generate the modulated voltage $V_{CC}$.

As described in detail below, the transceiver circuit 16 is configured to determine multiple modulated target voltage indicators $TGT_{ID1}$-$TGT_{IDN}$ in each of the voltage modulation intervals $S_{X-1}$, $S_X$, $S_{X+1}$. Instead of generating the single modulated voltage $V_{CC}$ for an entire duration $T_{SYM}$ of each of the voltage modulation intervals $S_{X-1}$, $S_X$, $S_{X+1}$, the PMIC 14 is configured to generate multiple modulated voltages $V_{CC1}$-$V_{CCN}$ in each of the voltage modulation intervals $S_{X-1}$, $S_X$, $S_{X+1}$ based on the modulated target voltage indicators $TGT_{ID1}$-$TGT_{IDN}$, respectively. By replacing the single modulated voltage $V_{CC}$ with the multiple modulated voltages $V_{CC1}$-$V_{CCN}$ in each of the voltage modulation intervals $S_{X-1}$, $S_X$, $S_{X+1}$, the PMIC 14 can adapt the modulated voltage $V_{CC}$ more frequently to closely track the time-variant input power $P_{IN}(t)$ of the RF signal 20. As a result, the power amplifier circuit 18 can achieve a higher efficiency when amplifying the RF signal 20, in addition to preventing distortion (e.g., amplitude clipping) in the RF signal 20.

Figure 3:
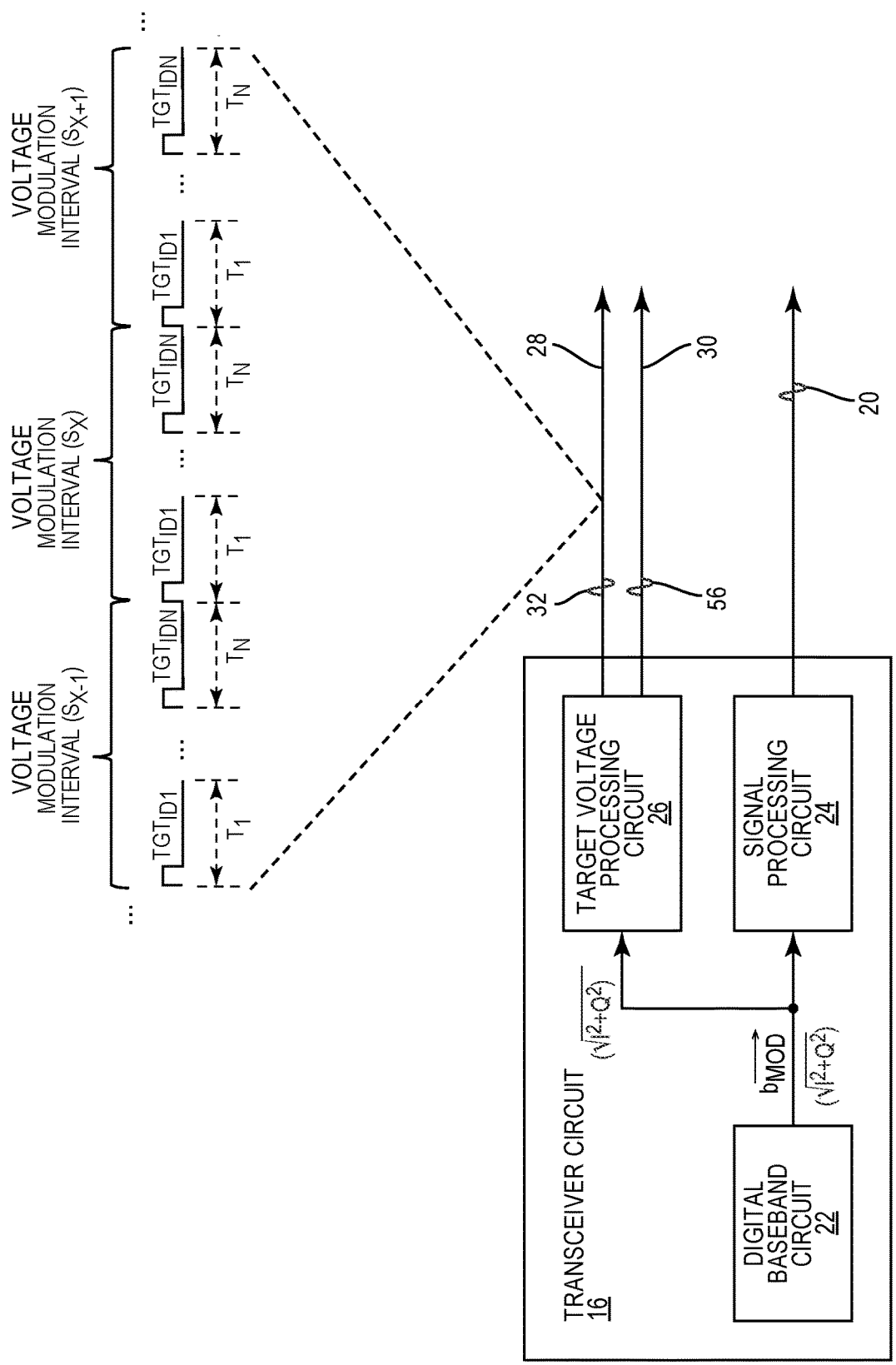
FIG. 3 is a schematic diagram providing an exemplary illustration of the transceiver circuit in FIG. 2 configured according to an embodiment of the present disclosure.

FIG. 3 is a schematic diagram providing an exemplary illustration of the transceiver circuit 16 in FIG. 2 configured according to an embodiment of the present disclosure. Common elements between FIGS. 2 and 3 are shown therein with common element numbers and will not be re-described herein.

In an embodiment, the transceiver circuit 16 includes a digital baseband circuit 22, a signal processing circuit 24, and a target voltage processing circuit 26. The digital baseband circuit 22 is configured to generate a digital input vector $\vec{b}_{MOD}$ having a time-variant amplitude $\sqrt{I^2+Q^2}$. Herein, I and Q represent in-phase and quadrature amplitudes of the digital input vector $\vec{b}_{MOD}$, respectively.

The signal processing circuit 24 may include a digital-to-analog converter(s) (ADC), a frequency converter(s), and a frequency filter(s), as an example. The signal processing circuit 24 is configured to convert the digital input vector $\vec{b}_{MOD}$ into the RF signal 20 and modulate the RF signal 20 onto the symbols 14(1)-14(N) in FIG. 1.

The target voltage processing circuit 26 is coupled to the PMIC 14 via a single-wire communication bus 28 and a multi-wire communication bus 30. In a non-limiting example, the multi-wire communication bus 30 can be an RF front-end (RFFE) bus. In an embodiment, the target voltage processing circuit 26 is configured to divide each of the voltage modulation intervals $S_{X-1}$, $S_X$, $S_{X+1}$ into multiple voltage modulate subintervals $T_1$-$T_N$. Herein, the target voltage processing circuit 26 may divide each of the voltage modulation intervals $S_{X-1}$, $S_X$, $S_{X+1}$, either equally or unequally, into the voltage modulate subintervals $T_1$-$T_N$. The target voltage processing circuit 26 is also configured to determine the modulated target voltage indicators $TGT_{ID1}$-$TGT_{IDN}$ in each of the voltage modulation intervals $S_{X-1}$, $S_X$, $S_{X+1}$ based on the time-variant amplitude $\sqrt{I^2+Q^2}$ of the digital input vector $\vec{b}_{MOD}$. The target voltage processing circuit 26 is further configured to communicate the modulated target voltage indicators $TGT_{ID1}$-$TGT_{IDN}$ in a target voltage signal 32 at a beginning of each of the voltage modulation intervals $S_{X-1}$, $S_X$, $S_{X+1}$.

In one embodiment, the target voltage processing circuit 26 can generate a respective one of the modulated target voltage indicators $TGT_{ID1}$-$TGT_{IDN}$ as a target voltage change relative to an immediately preceding one of the modulated target voltage indicators $TGT_{ID1}$-$TGT_{IDN}$. For example, the modulated target voltage indicator $TGT_{ID1}$ in the voltage modulation interval $S_X$ indicates a target voltage change relative to the modulated target voltage indicator $TGT_{IDN}$ in the voltage modulation interval $S_{X-1}$, and the modulated target voltage indicator $TGT_{ID2}$ in the voltage modulation interval $S_X$ indicates a target voltage change relative to the modulated target voltage indicator $TGT_{ID1}$ in the voltage modulation interval $S_X$.

In another embodiment, the target voltage processing circuit 26 can generate a first modulated target voltage indicator $TGT_{ID1}$ in each of the voltage modulation intervals $S_{X-1}$, $S_X$, $S_{X+1}$ to include an initial target voltage and generate each of the modulated target voltage indicators $TGT_{ID2}$-$TGT_{IDN}$ succeeding the first modulated target voltage indicators $TGT_{ID1}$ to include a target voltage change relative to an immediately preceding one of the modulated target voltage indicators $TGT_{ID1}$-$TGT_{IDN}$. For example, the modulated target voltage indicator $TGT_{ID1}$ in the voltage modulation interval $S_X$ indicates an initial target voltage of the voltage modulation interval $S_X$, and the modulated target voltage indicator $TGT_{ID2}$ in the voltage modulation interval $S_X$ indicates a target voltage change relative to the first modulated target voltage indicator $TGT_{ID1}$ in the voltage modulation interval $S_X$. As such, the target voltage processing circuit 26 can reset the initial target voltage at the beginning of each of the voltage modulation intervals $S_{X-1}$, $S_X$, $S_{X+1}$.

According to an embodiment of the present disclosure, the target voltage processing circuit 26 is configured to pulse-width modulate each of the modulated target voltage indicators $TGT_{ID2}$-$TGT_{IDN}$. In this regard, FIG. 4 provides an exemplary illustration as to how the modulated target voltage indicators $TGT_{ID2}$-$TGT_{IDN}$ can each be pulse-width modulated to represent different digital target voltage values $TGT_{V1}$-$TGT_{VK}$.

Herein, each of the digital target voltage values $TGT_{V1}$-$TGT_{VK}$ in any of the modulated target voltage indicators $TGT_{ID2}$-$TGT_{IDN}$ can be represented by a respective one of multiple pulse-width modulated (PWM) pulses 34(1)-34(K). The PWM pulses 34(1)-34(K) each have a respective rising edge 35R and a respective falling edge 35F that define a respective one of the pulse widths $W_1$-$W_K$. Since the digital target voltage values $TGT_{V1}$-$TGT_{VK}$ are different from one another, the pulse widths $W_1$-$W_K$ need to be different from one another as well. For example, the digital target voltage value $TGT_{V1}$ is represented by the pulse width $W_1$, the digital target voltage value $TGT_{V2}$ is represented by the pulse width $W_2$, and the digital target voltage value $TGT_{VK}$ is represented by the pulse width $W_K$.

In an embodiment, the pulse widths $W_1$-$W_K$ are inversely related to the digital target voltage values $TGT_{V1}$-$TGT_{VK}$. For example, if $TGT_{V1}>TGT_{V2}> \ldots >TGT_{VK}$, then $W_1<W_2< \ldots <W_K$. Notably, by using the shortest pulse width $W_1$ to represent the highest digital target voltage values $TGT_{V1}$ and, conversely, using the longest pulse width $W_K$ to represent the lowest digital target voltage values $TGT_{VK}$, it will take a shorter time to demodulate the highest digital target voltage values $TGT_{V1}$ in any voltage modulation subinterval $T_X$ ($T_X \in T_1$-$T_N$) among the voltage modulate subintervals $T_1$-$T_N$, thus leaving sufficient time in the voltage modulation subinterval $T_X$ to ramp up a respective one of the modulated voltages $V_{CC1}$-$V_{CCN}$ to the highest digital target voltage values $TGT_{V1}$.

Further, to ensure that there is also sufficient time in the voltage modulate subinterval $T_X$ to generate a respective one of the modulated voltages $V_{CC1}$-$V_{CCN}$ according to the lowest digital target voltage values $TGT_{VK}$, the pulse width $W_K$ (a.k.a. the largest pulse width among the pulse widths $W_1$-$W_K$) is so determined to be substantially smaller than the voltage modulation subinterval $T_X$. In a non-limiting example, the largest pulse width $W_K$ is said to be substantially smaller than the voltage modulation subinterval $T_X$ when the largest pulse width $W_K$ is less than ten percent (<10%) of the voltage modulation subinterval $T_X$ ($W_K<T_X/10$). According to an embodiment of the present disclosure, the largest pulse width $W_K$ is less than two nanoseconds ($W_K<2$ ns).

With reference back to FIG. 2, the PMIC 14 includes a target voltage circuit 36 and a voltage generation circuit 38. The target voltage circuit 36 is coupled to the transceiver circuit 16 via the single-wire communication bus 28 and the multi-wire communication bus 30. In this regard, in each of the voltage modulation intervals $S_{X-1}$, $S_X$, $S_{X+1}$, the target voltage circuit 36 is configured to receive the modulated target voltage indicators $TGT_{ID1}$-$TGT_{IDN}$ during the voltage modulate subintervals $T_1$-$T_N$, respectively, via the single-wire communication bus 28.

As described in detail below, the target voltage circuit 36 is configured to demodulate each of the modulated target voltage indicators $TGT_{ID1}$-$TGT_{IDN}$ to thereby generate a respective one of multiple target voltages $V_{TGT1}$-$V_{TGTN}$. The voltage generation circuit 38, in turn, can generate the modulated voltages $V_{CC1}$-$V_{CCN}$ in each of the voltage modulation intervals $S_{X-1}$, $S_X$, $S_{X+1}$ based on the target voltages $V_{TGT1}$-$V_{TGTN}$, respectively.

According to an embodiment of the present disclosure, the target voltage circuit 36 includes a target voltage demodulator circuit 40 and a target voltage lookup table (LUT) circuit 42. The target voltage demodulator circuit 40 is configured to receive the modulated target voltage indicators $TGT_{ID1}$-$TGT_{IDN}$ during the voltage modulate subintervals $T_1$-$T_N$, respectively, via the single-wire communication bus 28. The target voltage demodulator circuit 40 is also configured to demodulate each of the modulated target voltage indicators $TGT_{ID1}$-$TGT_{IDN}$ to generate a respective one of multiple digital target voltage values $TGT_1$-$TGT_N$.

In an embodiment, the target voltage LUT circuit 42 may include a LUT 44 that correlates each of the digital target voltage values $TGT_1$-$TGT_N$ with a respective one of the target voltages $V_{TGT1}$-$V_{TGTN}$. In a non-limiting example, the LUT 44 can be programmed by the transceiver circuit 16 via the multi-wire communication bus 30, either statically (e.g., during factory and/or field calibration) or dynamically (e.g., based on modulation bandwidth of the RF signal 20). Accordingly, the target voltage LUT circuit 42 can use the LUT 44 to convert each of the digital target voltage values $TGT_1$-$TGT_N$ into a respective one of the target voltages $V_{TGT1}$-$V_{TGTN}$.

The target voltage demodulator circuit 40 can be configured to detect a respective one of the pulse widths $W_1$-$W_K$ of a respective one of the PWM pulses 34(1)-34(K) in each of the modulated target voltage indicators $TGT_{ID1}$-$TGT_{IDN}$ to thereby determine a respective one of the digital target voltage values $TGT_{V1}$-$TGT_{VK}$. In this regard, FIG. 5 is a schematic diagram providing an exemplary illustration of the target voltage demodulator circuit 40, which is provided in the target voltage circuit 36 of the PMIC 14 in FIG. 2 and configured according to an embodiment of the present disclosure. Common elements between FIGS. 2 and 5 are shown therein with common element numbers and will not be re-described herein.

In an embodiment, the target voltage demodulator circuit 40 includes a clock generator 46. The clock generator 46 is configured to generate a clock signal DCLK based on the target voltage signal 32. More specifically, the clock generator 46 generates the clock signal DCLK to have a higher frequency $f_{DCLK}$ than a frequency $f_{TGT}$ of the target voltage signal 32, as expressed in equation (Eq. 1) below.

$$f_{DCLK} = M * f_{TGT} \quad (Eq.\ 1)$$

In the equation (Eq. 1), $f_{DCLK}$ represents the frequency of the clock signal DCLK, $f_{TGT}$ represents the frequency of the target voltage signal 32, and M represents a scaling factor that is greater than one (M>1). Understandably, the scaling factor M depends on how many different values of the modulated target voltage indicators $TGT_{ID1}$-$TGT_{IDN}$ are conveyed in the target voltage signal 32. In other words, the more the modulated target voltage indicators $TGT_{ID1}$-$TGT_{IDN}$ are conveyed in the target voltage signal 32, the higher the scaling factor M needs to be. According to an embodiment of the present disclosure, the scaling factor M is set to ten (M=10).

The target voltage demodulator circuit 40 also includes multiple first digital flip-flops 48 and multiple second digital flip-flops 50. The first digital flip-flops 48 are each coupled to a first delay line 52 and the second digital flip-flops 50 are each coupled to a second delay line 54. In an embodiment, the transceiver circuit 16 may calibrate the first delay line 52 and/or the second delay line 54 via a calibration signal 56, which may be provided to the target voltage demodulator circuit 40 via the multi-wire communication bus 30.

Herein, each of the first digital flip-flops 48 is configured to receive a first clock signal 58 and a first data signal 60, and each of the second digital flip-flops 50 is configured to receive a second clock signal 62 and a second data signal 64. According to an embodiment of the present disclosure, the first clock signal 58 is an inversion of the target voltage signal 32, the first data signal 60 and the second clock signal 62 are the clock signal DCLK, and the second data signal 64 is the target voltage signal 32.

FIG. 6 is a schematic diagram providing an exemplary illustration as to how the target voltage demodulator circuit 40 in FIG. 5 operates based on the configuration in FIG. 5. According to the configuration in FIG. 5, the first digital flip-flops 48 are each clocked by the respective falling edge 35F of one of the PWM pulses 34(1)-34(K) received in the target voltage signal 32 to detect a rising edge 66 of the clock signal DCLK. In contrast, the second digital flip-flops 50 are each clocked by the rising edge 66 of the clock signal DCLK to detect the respective rising edge 35R of one of the PWM pulses 34(1)-34(K) received in the target voltage signal 32.

In this regard, some or all of the first digital flip-flops 48 may be clocked by the falling edge 35F of any of the PWM pulses 34(1)-34(K) to generate a first thermos-encoded digital word $D_1$ that represents a first temporal difference $\tau_1$ between the rising edge 66 of the clock signal DCLK and the falling edge 35F of any of the PWM pulses 34(1)-34(K). In contrast, some or all of the second digital flip-flops 50 may be clocked by the rising edge 66 of the clock signal DCLK to generate a second thermos-encoded digital word $D_2$ that represents a second temporal difference $\tau_2$ between the rising edge 35R of any of the PWM pulses 34(1)-34(K) and the rising edge 66 of the clock signal DCLK.

With reference back to FIG. 5, the target voltage demodulator circuit 40 also include a first digital encoder 68, a second digital encoder 70, and a combiner 72. The first digital encoder 68 is configured to encode the first thermos-encoded digital word $D_1$ into a first binary word $BIN_1$. The second digital encoder 70 is configured to encode the second thermos-encoded digital word $D_2$ into a second binary word $BIN_2$. The combiner 72 is configured to combine the first binary word $BIN_1$ and the second binary word $BIN_2$ to generate a respective one of the digital target voltage values $TGT_1$-$TGT_N$. Understandably from the illustration in FIG. 6, each of the digital target voltage values $TGT_1$-$TGT_N$ would reflect one of the pulse widths $W_1$-$W_K$ in a respective one of the modulated target voltage indicators $TGT_{ID1}$-$TGT_{IDN}$.

According to an embodiment of the present disclosure, the first digital encoder 68 and/or the second digital encoder 70 may be configured according to whether the first thermos-encoded digital word $D_1$ and/or the second thermos-encoded digital word $D_2$ are saturated thermos-encoded digital words. Herein, the saturated thermos-encoded digital word refers to a thermos-encoded digital word consisting of only "1s" or "0s."

The first digital encoder 68 may send a first saturation indication signal 74 to the clock generator 46 in response to the first binary word $D_1$ being a saturated thermos-encoded digital word. Likewise, the second digital encoder 70 may send a second saturation indication signal 76 to the clock generator 46 in response to the second binary word $D_2$ being the saturated thermos-encoded digital word. The clock generator 46, in turn, may advance or delay the clock signal DCLK in response to receiving the first saturation indication signal 74 and/or the second saturation indication signal 76.

The wireless communication circuit 12 of FIG. 2 can be provided in a user element to enable intra-symbol voltage modulation according to embodiments described above. In this regard, FIG. 7 is a schematic diagram of an exemplary user element 100 wherein the wireless communication circuit 12 of FIG. 2 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

The wireless communication circuit 12 of FIG. 2 can be configured to enable intra-symbol voltage modulation according to a process. In this regard, FIG. 8 is a flowchart illustrating a process 200 that can be employed by the wireless communication circuit 12 of FIG. 2 to enable intra-symbol voltage modulation.

Herein, the digital baseband circuit 22 generates the digital input vector $\vec{b}_{MOD}$ having a time-variant amplitude $\sqrt{I^2+Q^2}$ (step 202). The target voltage processing circuit 26 divides each of the voltage modulation intervals $S_{X-1}$, $S_X$, $S_{X+1}$ into the voltage modulation subintervals T1-TN (step 204). Next, the target voltage processing circuit 26 determines a respective one of the modulated target voltage indicators $TGT_{ID1}$-$TGT_{IDN}$ for each voltage modulation subinterval $T_1$-$T_N$ based on the time-variant amplitude $\sqrt{I^2+Q^2}$ of the digital input vector $\vec{b}_{MOD}$ (step 206). Accordingly, the target voltage processing circuit 26 generates the target voltage signal 32 including the plurality of modulated target voltage indicators $TGT_{ID1}$-$TGT_{IDN}$ (step 208).

Those skilled in the art will recognize improvements and modifications to the preferred embodiments of the present disclosure. All such improvements and modifications are considered within the scope of the concepts disclosed herein and the claims that follow.

What is claimed is:

1. A transceiver circuit comprising:
   a digital baseband circuit configured to generate a digital input vector having a time-variant amplitude; and
   a target voltage processing circuit configured to:
      divide each of a plurality of voltage modulation intervals into a plurality of voltage modulation subintervals;
      determine a respective one of a plurality of modulated target voltage indicators for each of the plurality of voltage modulation subintervals based on the time-variant amplitude of the digital input vector; and
      generate a target voltage signal comprising the plurality of modulated target voltage indicators.

2. The transceiver circuit of claim 1, wherein the target voltage processing circuit is further configured to equally divide each of the plurality of voltage modulation intervals into the plurality of voltage modulation subintervals.

3. The transceiver circuit of claim 1, wherein the target voltage processing circuit is further configured to unequally divide each of the plurality of voltage modulation intervals into the plurality of voltage modulation subintervals.

4. The transceiver circuit of claim 1, wherein the target voltage processing circuit is further configured to:
   determine a first one of the plurality of modulated target voltage indicators to include an initial target voltage in the respective one of the plurality of voltage modulation intervals; and
   determine each of the plurality of modulated target voltage indicators succeeding the first one of the plurality of modulated target voltage indicators to include a target voltage change relative to an immediately preceding one of the plurality of modulated target voltage indicators.

5. The transceiver circuit of claim 1, wherein the target voltage processing circuit is further configured to pulse-width modulate each of the plurality of modulated target voltage indicators to have a respective one of a plurality of pulse widths corresponding to a respective one of a plurality of digital target voltage values.

6. The transceiver circuit of claim 5, wherein a duration of a largest one of the plurality of pulse widths is substantially smaller than any of the plurality of voltage modulation subintervals.

7. The transceiver circuit of claim 5, wherein the plurality of pulse widths is inversely related to the plurality of digital target voltage values.

8. The transceiver circuit of claim 1, further comprising a signal processing circuit configured to convert the digital input vector into a radio frequency (RF) signal and modulate the RF signal onto a plurality of symbols each corresponding to a respective one of the plurality of voltage modulation intervals.

9. The transceiver circuit of claim 1, wherein the target voltage processing circuit is coupled to a single-wire communication bus and a multi-wire communication bus and configured to communicate the target voltage signal over the single-wire communication bus.

10. A wireless communication circuit comprising:
    a transceiver circuit comprising:
       a digital baseband circuit configured to generate a digital input vector having a time-variant amplitude; and
       a target voltage processing circuit configured to:
          divide each of a plurality of voltage modulation intervals into a plurality of voltage modulation subintervals;
          determine a respective one of a plurality of modulated target voltage indicators for each of the plurality of voltage modulation subintervals based on the time-variant amplitude of the digital input vector; and
          generate a target voltage signal comprising the plurality of modulated target voltage indicators.

11. The wireless communication circuit of claim 10, further comprising a power management integrated circuit (PMIC) comprising:

a target voltage circuit comprising:
- a target voltage demodulator circuit coupled to the transceiver circuit via a single-wire communication bus and a multi-wire communication bus and configured to:
  - receive the target voltage signal via the single-wire communication bus; and
  - demodulate each of the plurality of modulated target voltage indicators to generate a respective one of a plurality of digital target voltage values; and
- a target voltage lookup table, LUT, circuit configured to convert each of the plurality of digital target voltage values into a respective one of a plurality of voltage targets; and
- a voltage generation circuit configured to generate a plurality of modulated voltages in the plurality of voltage modulation subintervals based on the plurality of voltage targets, respectively.

12. The wireless communication circuit of claim 11, further comprising a power amplifier circuit configured to amplify the RF signal in the plurality of voltage modulation subintervals based on the plurality of modulated voltages, respectively.

13. A method for generating a target voltage for intra-symbol voltage modulation comprising:
- generating a digital input vector having a time-variant amplitude;
- dividing each of a plurality of voltage modulation intervals into a plurality of voltage modulation subintervals;
- determining a respective one of a plurality of modulated target voltage indicators for each of the plurality of voltage modulation subintervals based on the time-variant amplitude of the digital input vector; and
- generating a target voltage signal comprising the plurality of modulated target voltage indicators.

14. The method of claim 13, further comprising equally dividing each of the plurality of voltage modulation intervals into the plurality of voltage modulation subintervals.

15. The method of claim 13, further comprising unequally dividing each of the plurality of voltage modulation intervals into the plurality of voltage modulation subintervals.

16. The method of claim 13, further comprising:
- determining a first one of the plurality of modulated target voltage indicators to include an initial target voltage in the respective one of the plurality of voltage modulation intervals; and
- determining each of the plurality of modulated target voltage indicators succeeding the first one of the plurality of modulated target voltage indicators to include a target voltage change relative to an immediately preceding one of the plurality of modulated target voltage indicators.

17. The method of claim 13, further comprising pulse-width modulating each of the plurality of modulated target voltage indicators to have a respective one of a plurality of pulse widths corresponding to a respective one of a plurality of digital target voltage values.

18. The method of claim 17, wherein the plurality of pulse widths is inversely related to the plurality of digital target voltage values.

19. The method of claim 13, further comprising:
- demodulating each of the plurality of modulated target voltage indicators to generate a respective one of a plurality of digital target voltage values;
- converting each of the plurality of digital target voltage values into a respective one of a plurality of voltage targets; and
- generating a plurality of modulated voltages in the plurality of voltage modulation subintervals based on the plurality of voltage targets, respectively.

20. The method of claim 19, further comprising amplifying the RF signal in the plurality of voltage modulation subintervals based on the plurality of modulated voltages, respectively.

* * * * *